Sheet 2-2 Sheets.
C. Johnson,
Spherometer,
Nº 568.
Patented Jan. 9, 1838.
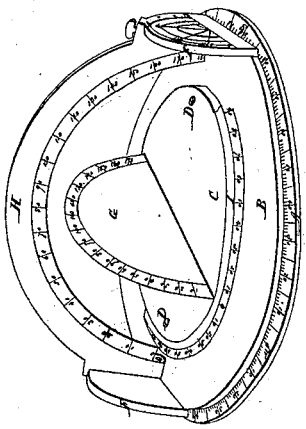

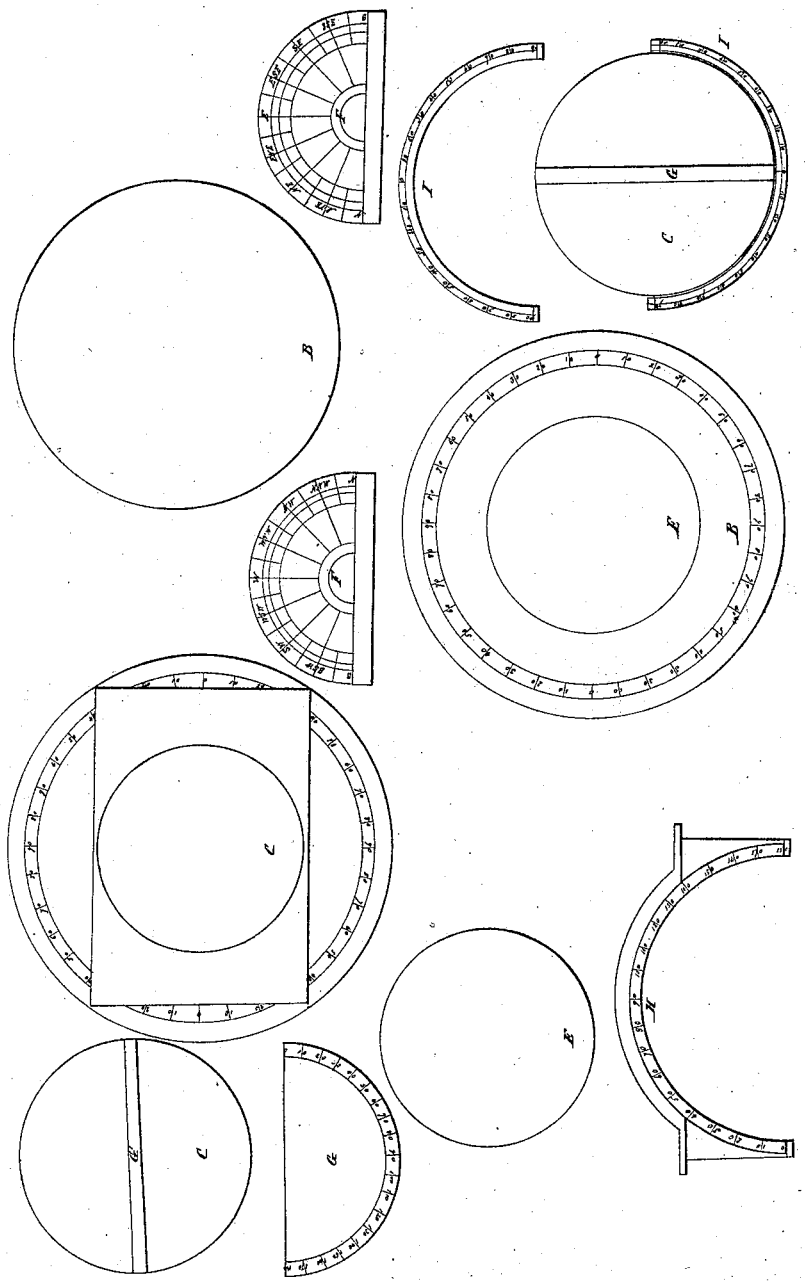
C. Johnson,
Spherometer,
Nº 568. Patented Jan. 9, 1838.

UNITED STATES PATENT OFFICE.

CEPHAS JOHNSON, OF SOUTHINGTON, CONNECTICUT.

SPHEROMETER FOR ASCERTAINING THE RELATIVE BEARING OF PLACES, &c.

Specification of Letters Patent No. 568, dated January 9, 1838.

*To all whom it may concern:*

Be it known that I, CEPHAS JOHNSON, of Southington, in the county of Hartford and State of Connecticut, have invented a new and useful improvement in machinery for ascertaining the relative bearings of places, directing a ship by the shortest course from one place to another, running lines, and determining true distances by means of an instrument, which I denominate a "Spherometer or coursing instrument"; and I hereby declare that the following is a full and exact description of the same as invented by me.
The instrument may be made of brass or any other suitable material.

It is composed principally of three circular plates, of which the bottom plate A, is the largest, the central plate is the smallest, and the upper plate C, projects over the central plate E, which is hidden by it is the perspective view. The three plates are united by screws D, D, in a horizontal position. On the base or bottom plate A the degrees of latitude are marked ninety degrees on each quarter, making in the whole three hundred and sixty degrees, beginning at either end of an equinoctial circle placed on the upper plate, and meeting in the quadrant of the circle on either side of the equinoctial circle, or at what may be called the poles of the instrument.

A circular ring B called a sliding meridian, lies in a horizontal position between the lower and the upper plates, and around the central plate, around which it revolves when required. On the outer side of this ring and opposite to each other are two smaller semicircular plates F, F united at their bases with the edges of the ring B in a vertical position, and called compass plates. On these semicircular plates are marked the points of the compass in their order, half of the points being on each plate;
the eastern points being marked on the plate on the western side of the instrument, and the western points on the plate on the eastern side of the instrument. On each plate the east or west point is on the upper side of its respective plate. On the upper horizontal circular plate is a semicircular plate G placed in a vertical position and united at its base to the horizontal circular plate across its center. The circular edge of this semicircular plate has a bevel on each side, and is graduated on each bevel with the degrees of longitude, being one hundred and eighty degrees on each side on each bevel, beginning at each angle subtended at each end of the base; the degrees marked on the south side of the semicircle beginning on the west side of the instrument, and the degrees on the north side of the semicircle beginning on the east side of the instrument.
This is called the equinoctial circle. Connected with the sliding or revolving meridian is the semicircular segment of a ring H of one hundred and eighty degrees, attached to the outer edges where the semicircular plates are united to the circular ring or sliding meridian, and turning on pivots upon the inner center of the bases of the compass plates. The inner edge of this segment of a ring is beveled on each side; the segment itself being called a prime vertical. The ends of the prime vertical are so formed that by having a shoulder, project over the circular edge of the compass plates to the outer surface for the purpose of complying in its movement with the desired latitude, it corresponds with the points of compass marked on the compass plates. The inner edge of the prime vertical is graduated on each bevel one hundred and eighty degrees;
the graduation on the bevel of the south side commencing where the end of the prime vertical is connected with the compass plate on the western side of the instrument, and the graduation on the bevel of the north side commencing where the prime vertical is connected with the compass plate on the eastern side of the instrument.

Attached or connected by pivots with the upper horizontal circular plate is another segment of a ring I, of one hundred and eighty degrees turning on those pivots, the pivots being entered into the upper circular plate at the ends of a diagonal drawn across the center of the plate at a right angle with the equinoctial circle and corresponding with the poles of the instrument. This segment of a ring is called a movable meridian, having both its inner and its outer edges beveled on both sides and graduated with ninety degrees on the bevels of the outer side in the following manner: Commencing at the center, or where it corresponds with the edge of the equinoctial circle, and proceeding to where it turns on the screws at its union with the horizontal plate; and so of the other side opposite either, to correspond with the eastern points of compass on the compass plates.

The instrument is exhibited with its various parts in the annexed drawing, which is made a part of this specification.

The object of the instrument is to determine the true point of compass in all latitudes and longitudes, and to lay courses and measure distances in all directions on any part of the globe. In using it to determine the point of compass of one place from another: Move the sliding meridian so that one compass plate shall have the center of its base correspond with the degree of latitude of the place from which the course is calculated; the direction to be taken whether east or west determines the compass plate that is to be used; that is, if an eastern course is to be found, use the compass plate marked with the eastern points on the western side of the instrument; and if a western course, use the compass plate marked with the western points on the eastern side of the instrument. Then find the difference of longitude between the two places on the equinoctial circle, and bring the movable meridian to that degree, which denotes the difference of longitude. Then bring the prime vertical to the latitude of the last place being found on the movable meridian, and the point of compass with which the prime vertical corresponds on the compass plate used, will be the course from the first to the last place, but this will not hold vice versa from the last to the first place; but the course must be determined in the same way as the above.

For example: to find the direction in which Genoa lies from Quito: Quito being under the equator and eighty degrees of longitude west of Greenwich, and Genoa forty five degrees of north latitude and ten degrees of east longitude, making forty five degrees of difference of latitude, and ninety degrees of difference of longitude between the two pdaces: bring the center of the compass plate marked with the eastern points of the compass to the equator for Quito. Then bring the movable meridian to ninety degrees marked on the south side of the equinoctial circle, because the places differ ninety degrees in longitude. Then bring the prime vertical to forty five degrees on the northern part of the movable meridian for Genoa. The point with which the prime vertical corresponds on the compass plate will be found northeast, which is the direction in which Genoa lies from Quito. But it does not follow, as is generally supposed, and laid down in books that Quito is southeast from Genoa.

To determine the course from Genoa to Quito: bring the center of the compass plate marked with the western points of compass to forty five degrees marked on the north side of the base plate for Genoa. Bring the movable meridian to ninety degrees on the north side of the equinoctial circle for the difference of longitude of the two places. Then bring the prime vertical to the center of the movable meridian for the latitude of Quito. The prime vertical will be found to correspond on the compass with the west point, which is the direction of Quito from Genoa; that is, Genoa is northeast of Quito, and Quito is west of Genoa. The instrument being in the position above mentioned, counting the number of degrees on the prime vertical to where it corresponds with the movable meridian, shows the distance from one place to the other in geographical miles. We thus find that Genoa is distant from Quito 4300 geographical miles or 6265 English miles. Also running by log: knowing the ship's course, and rate of sailing, the latitude and longitude of the ship are readily determined by using the instrument; and a day's run or reckoning is quickly calculated without reference to tables.

For the more perfect understanding of the principles of my invention, I subjoin the following remarks.

Every one knows the necessity of ascertaining practically the precise point of compass especially in navigation: and yet the methods in common use are incorrect. They furnish a near approximation to the true course in the vicinity of the equator, but not in higher latitudes. In sailing from one port to another in high latitudes, or if either place be in a high latitude, the course by compass must be constantly varied in order to sail in the most direct manner, of which the winds and current will admit. Any two places on the equinoctial line are east and west from each other. But in approaching the poles, two places in the same latitude are not east and west from each other, but increase in variation from the equator to the poles. A place sailed for on the equator being 90 degrees distant in longitude from the place of departure, the place sailed for is east or west from the place of departure, let that place be in what latitude it may. In other words, a place on the equator 90 degrees distant in longitude, is east or west from a place in any latitude on that meridian. The prime vertical being a circle passing through the zenith of a place and crossing the equator 90 degrees distant from the place, uniting at the nadir of the place; the points where the prime vertical crosses the equator being the east and west points; a ship sailing toward one of these points finds as it approaches the equator that the point toward which it sails, recedes along the equator, being constantly 90 degrees distant from the place the ship is in.

If a ship in a high northern latitude should sail for a port in the same latitude with the place of departure, and should sail east by compass, making that course good, it would fall south of the port of destination. So, if the port of destination be in a higher or a lower latitude than the place of departure, calculating the course on the incorrect principle that two places in the same latitude are east and west from each other, the ship would fall south of the port of destination.

A ship having the course by compass correctly calculated and making that course good, would make north of the port of destination if in a northern latitude, and south if in a southern latitude, because the point recedes on the equator as the ship approaches it.

The equinoctial line is every point of compass from either pole; that is, the equinoctial line is both north and south from the North Pole and north and south from the South Pole. The North Pole is north and south of the South Pole. The South Pole is north and south of the North Pole. The South Pole is east of the North Pole. The North Pole is east of the South Pole. The Antipodes are both east and west from each other.

If the equinoctial line be south of the North Pole, sailing directly south by compass, would make the equator by the shortest course. Sailing north from the equator by compass, a ship would make the North Pole by the shortest course, and would then constantly revolve about it; and sailing any other point of compass would constantly sail around the globe in a spiral direction, approaching the equator but not arriving at it; and the nearness of the spiral line would increase or diminish, according as the point approached the pole or the equtor. The same reversed may be said of the southern hemisphere. The spheriodal form of the earth increases this variation: that is, if the earth were an exact globe, the east and west points would cross the equator at 90 degrees distant. The earth being spheroidal or flattened at the poles, the eastern and western points cross the equator at less than 90 degrees distant.

The dip of the needle also in approaching the poles inclines the points still nearer to each other than the oblateness itself. But the variation, which the instrument herein before described is intended to obviate arises from the globular form of the earth. If the earth were of a cylindrical form, and parallels of latitude drawn upon it, two places in the same latitude would be east and west from each other. If the earth were a plane, the same would hold true. If the earth were in the form of two cones united at their bases, and parallels of latitude drawn upon them, calling their union the equator and their vertices the poles, the points would vary according to the elevation of the cones. But at the greatest possible elevation two places in the same latitude would not be east and west of each other.

The preceding assertions can be clearly demonstrated by reference to an artificial terrestrial globe, and still more impressively by using the cylindrical, plane, or conical forms just mentioned.

For demonstration on a globe: mark a circular bit of paper in the form of a compass card, and lay it on different parts of the globe, and notice the direction of the points, always keeping the north and south points directed to the poles. Place this card with its center on Quito. It will be seen that the eastern and western points follow the direction of the equator. Its northeast point is toward Genoa. Now lay its center on Genoa. Its west point is toward Quito. Carry the card one degree of longitude toward Quito; the west point will pass Quito to the northward of it, and will cross the equator one degree to the westward of it. Again, place the card on Quito, and pass it one degree of longitude toward Genoa. The northeast point passes south of it. This shows, that if we would sail a direct course to a place, we must constantly vary the point of compass. Use the same card on a cylinder marked with parallels of latitude. Genoa would be northeast of Quito, and Quito southwest of Genoa; and continuing one point of compass from one to the other, would make the place. Try the same experiment on a plane, and the result will be the same. Place the card on different parts of the cones united at their bases as I have stated, and the appearances will be the same as I have mentioned in regard to cones.

The instrument may be made of any convenient size.

I do not claim any one of the parts of the instrument, which I have described, taken simply as my invention or improvement: but I do claim as my invention or improvement—

The combination above specified of the several parts of the said instrument, namely, the compass divided into two separate parts set vertically on the opposite sides of a circle, having the eastern points on one part, and the western points on the other part— the part on which the western points are marked standing on the eastern side, and that, on which the eastern points are marked, standing on the western side of the instrument: the prime vertical in the form of a semicircle attached to the compass plates, turning at its ends to correspond with said plates, beveled on the inner edge, graduated for measuring geographical miles, and having shoulders, projecting to indicate the point of compass: the movable meridian in the form of a semicircle, beveled on both edges, intersecting at once the prime vertical and equinoctial circle, and turning on pivots at the ends: the sliding meridian moving horizontally around a circular plate: the equinoctial circle set vertically, beveled on its circular edge, and graduated on both bevels, commencing at opposite ends on each bevel: the junction of the equinoctial circle at its base with a circular plate—all combined and made to move in the manner hereinbefore set forth to produce, and, by such combination and movements of the movable parts, producing the effect of ascertaining the relative bearings of places, directing a ship by the shortest course from one place to antother, running lines, and determining true distances.

Dated at Middletown the 14th day of February A. D. 1837.

CEPHAS JOHNSON.

In presence of—
 Wm. H. Child,
 Iona Barnes.